March 2, 1965 R. B. SLADEK 3,171,898

TELEPHONE SYSTEMS

Filed Feb. 10, 1959 4 Sheets-Sheet 1

INVENTOR
R. B. SLADEK
BY R. P. Miller
ATTORNEY

INVENTOR
R. B. SLADEK
BY R. P. Miller
ATTORNEY

March 2, 1965 R. B. SLADEK 3,171,898

TELEPHONE SYSTEMS

Filed Feb. 10, 1959 4 Sheets-Sheet 3

INVENTOR
R. B. SLADEK
BY R. P. Miller
ATTORNEY

March 2, 1965 R. B. SLADEK 3,171,898

TELEPHONE SYSTEMS

Filed Feb. 10, 1959 4 Sheets-Sheet 4

INVENTOR
R. B. SLADEK
BY R. P. Miller
ATTORNEY

United States Patent Office 3,171,898
Patented Mar. 2, 1965

3,171,898

TELEPHONE SYSTEMS

Robert B. Sladek, Cicero, Ill., assignor to Western Electric Company Incorporated, New York, N.Y., a corporation of New York Filed Feb. 10, 1959, Ser. No. 792,401
11 Claims. (Cl. 179—18)

This invention relates to telephone systems and more particularly, to telephone systems employing 200-line final selector switches in step-by-step dialing systems.

A 200-line final selector switch generally comprises a 600 point multiple two-movement switch bank which handles 200 subscriber lines. The final selector switch is connected between an even hundred group of subscriber lines and an odd hundred group of subscriber lines, and a preceding selector switch. The 600 point multiple bank of the final selector is provided with two sets of bank terminals; one set having a sleeve, a tip and a ring terminal for each line in the even hundred group and the other set having a sleeve, a tip and a ring terminal for each line in the odd hundred group. A set of wipers is provided for each set of bank terminals and a wiper switching relay selects either one or the other wiper set, depending upon whether the call originated in the even or odd hundred level of the preceding selector.

In prior 200-line final selector switches of this type, a wiper switching relay is generally controlled by either the talking path, or the tip and ring leads of the final selector, or else by test or sleeve leads in combination with a preceding selector switch which is specially designed for operation with 200-line final selector switches. Placing the wiper switching relay in the talking path, and thereby introducing an extra high resistance winding therein, reduces the maximum allowable length of the talking path between a called and a calling subscriber. Also, if it is necessary to have a specially designed preceding selector in order to control the wiper switching relay over the sleeve leads of the final selector, then the utility of such a system is greatly reduced and the final selector is not capable of being connected to any standard preceding selector switch designed for 100-line final selectors.

It is therefore an object of this invention to provide a new and improved telephone system.

Another object of this invention is to provide a telephone system having 200-line final selector switch which are operable with a standard type of preceding selector switch designed to control 100-line final selector switches.

Another object of this invention is to provide a telephone system employing a final selector switch having a plurality of wiper sets and a wiper switching relay operable to connect predetermined wiper sets according to the operation of a standard type preceding selector switch.

Another object of this invention is to provide a final selector switch having a plurality of wiper sets for connecting the final selector to corresponding groups of subscriber lines and having a wiper switching relay responsive to signals conducted over the sleeve lead of the final selector switch from a standard preceding selector.

In furtherance of the preceding object, it is a further object of this invention to provide a wiper switching relay which is initially operated by a forwardly extending temporary protective ground connection through the sleeve lead from a standard preceding selector switch and which is held operated by the final selector switch upon the seizure thereof for connecting the wiper set to be used.

Another object of this invention is to provide a telephone system having 200-line combination toll and local final selector switches which are operable with a standard type of preceding toll and local selector switch designed to control 100-line final selector switches.

Another object of this invention is to provide a combination local and toll final selector switch having a plurality of wiper sets for connecting the final selector to corresponding groups of subscriber lines and having a wiper switching relay responsive to signals conducted over the sleeve lead of the final selector switch from either a standard local preceding selector or a standard toll selector switch.

In concordance with the preceding object, it is an additional object of this invention to provide a wiper switching relay which is initially operated by a forwardly extending protective ground connection through the sleeve lead from either a standard toll or local preceding selector switch and which is held operated by the final selector switch upon the seizure thereof for connecting the wiper set to be used.

With these and other objects in view, the present invention contemplates a telephone system having a 200-line final selector switch designed so as to be used with standard toll and/or local preceding selector switches which are normally used to control 100-line final selector switches. The final selector comprises a wiper switching relay for selecting one of two sets of wipers of a 600 point multiple two-movement switch bank which handles 200 subscriber lines. One of the wiper sets is connected through the final selector to an even hundred level of a preceding local selector switch or to an even hundred level of a preceding toll selector switch and the other set of wipers is connected to an odd hundred level of either a preceding local or toll selector switch. The wiper switching relay remains unoperated upon calls originating from the even hundred level of the preceding selector switches and is operated upon calls originating from the odd hundred level of the preceding selectors. The operation of the wiper switch relay is caused by the application of a forwardly extending ground on the sleeve lead of the final selector upon the initial seizure thereof by the preceding selector. Upon the initial operation of the wiper switching relay, the relay closes contacts which locks in an energizing circuit within the final selector to retain the relay energized, in that, the forwardly extending ground from the preceding selector is often temporary. Therefore it may be understood that the wiper switching relay is used to connect either the odd or even wipers to the final selector upon seizure thereof and before stepping or positioning of the multiple bank wipers.

Other objects, advantages and novel aspects of the invention will become apparent upon consideration of the following detailed description in conjunction with the accompanying drawings wherein.

*General description*

Figure 3:
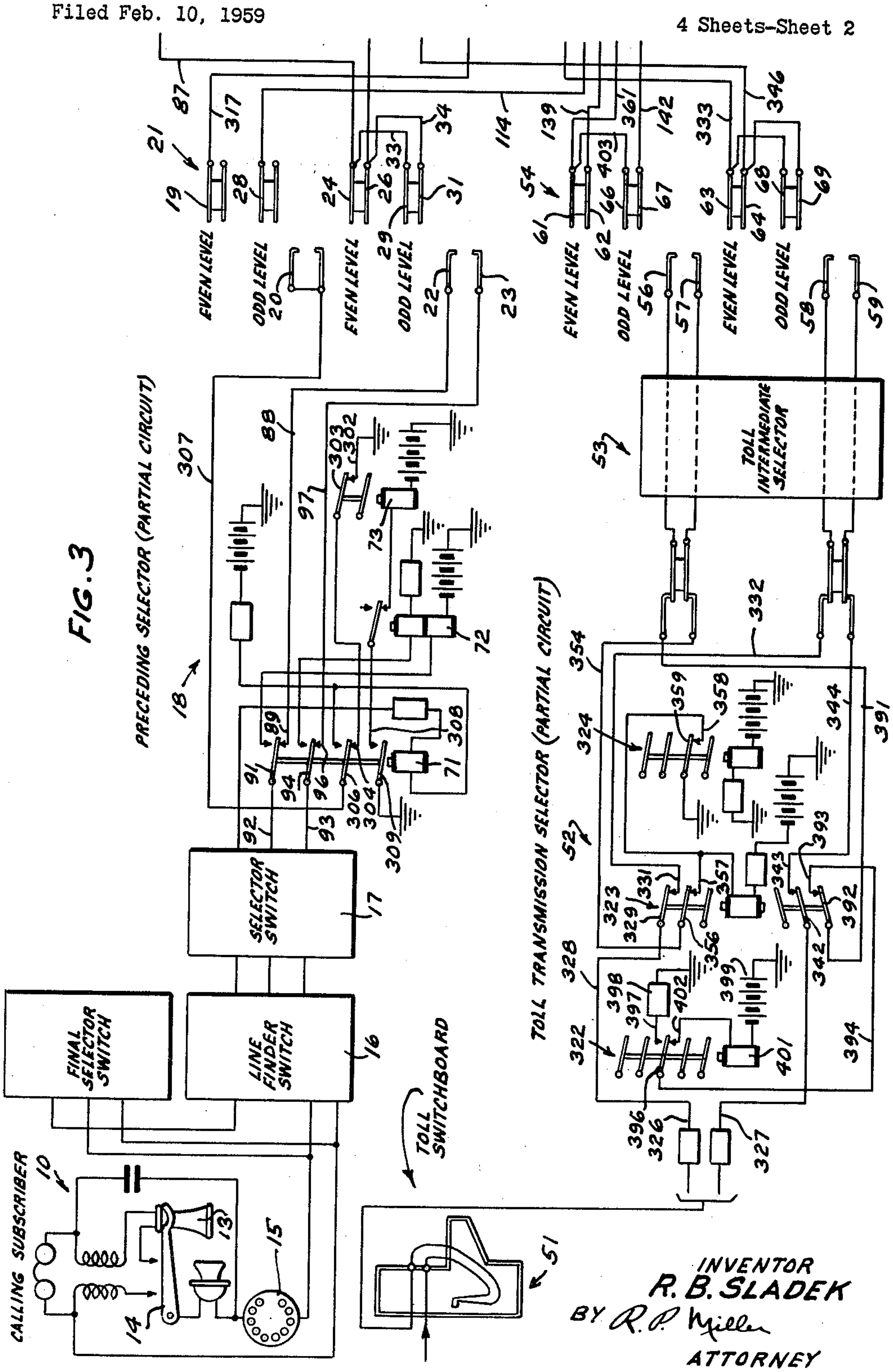
FIGS. 3, 4 and 5 are a schematic circuit diagram of a telephone system from a calling subscriber to a called subscriber particularly illustrating the details of the final selector switching arrangement embodying the principles of the present invention.
Figure 4:
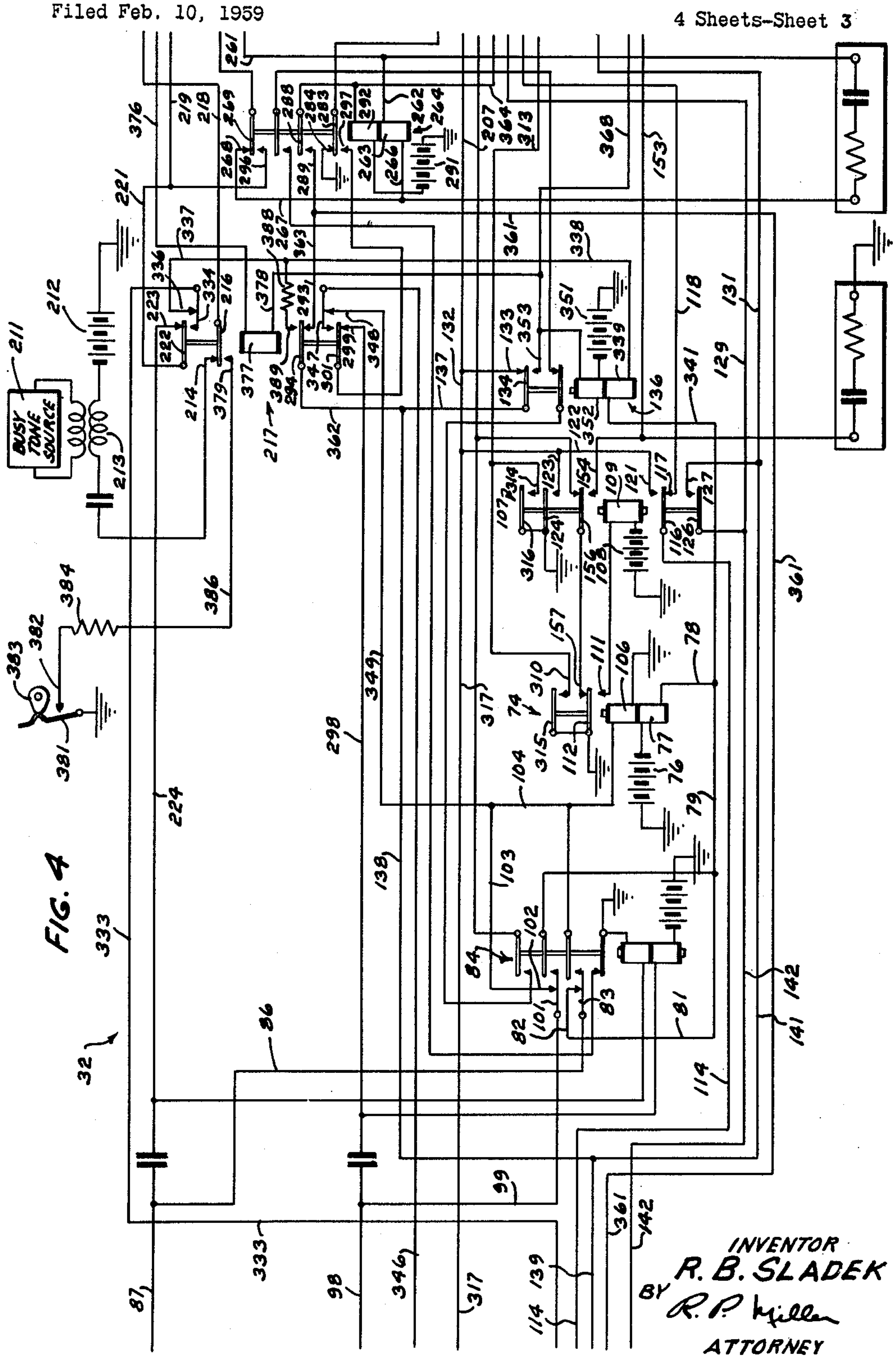
Figure 5:
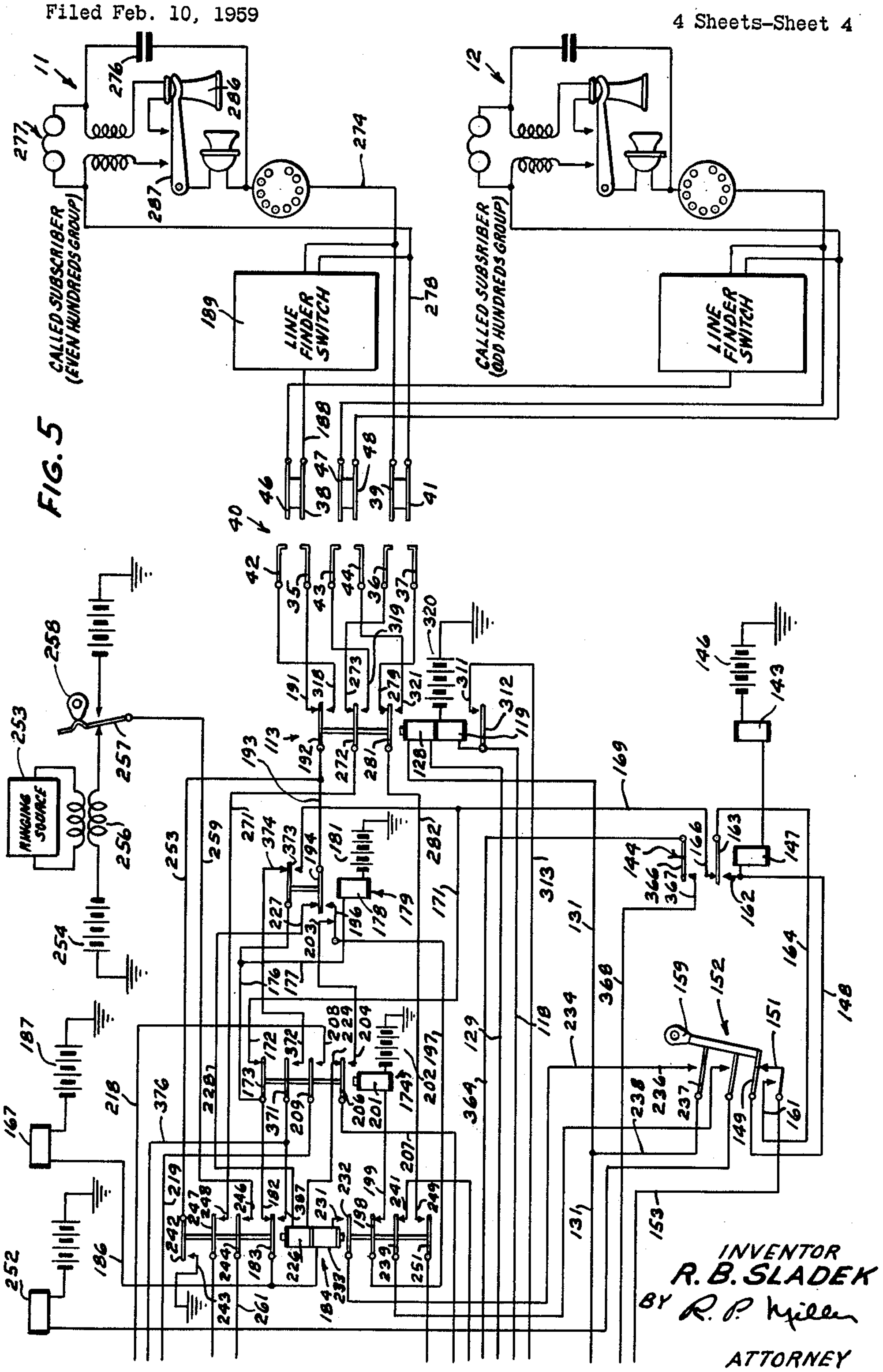

Referring to FIGS. 3, 4 and 5 wherein is shown a telephone system, commonly known as a step-by-step system, for connecting a calling subscriber 10 to a called subscriber 11 having a number ending in three digits that are in an even hundred group of subscriber lines or a subscriber 12 having a number ending in three digits that are in an odd hundred group of subscriber lines. The calling subscriber upon placing a call, lifts a receiver 13 from a switch hook 14 to seize a line finder switch 16 of a well known type and proceeds to call a desired number by means of dial 15. The line finder 16, a selector switch 17 and a preceding local selector 18, all commercially available and well known, are responsive to all but the last two digits of the called number to direct the call towards the called subscriber. If the last three digits of the called number are in an even hundred group, a sleeve wiper 20 of the preceding selector switch 18 will contact an even sleeve terminal 19 of a local preceding selector multiple switch bank 21. Also, a ring wiper 22 and a tip wiper 23 will be advanced to an even level within the bank 21 to contact an even ring terminal 24 and an even tip terminal 26. If, on the other hand, the called subscriber's number is in an odd hundred group, the sleeve wiper 20 will engage an odd sleeve terminal 28 of the multiple bank 21 and the ring and tip wipers 22 and 23 will be advanced to an odd level in the bank 21 to engage an odd ring terminal 29 and an odd tip terminal 31.

Figure 1:
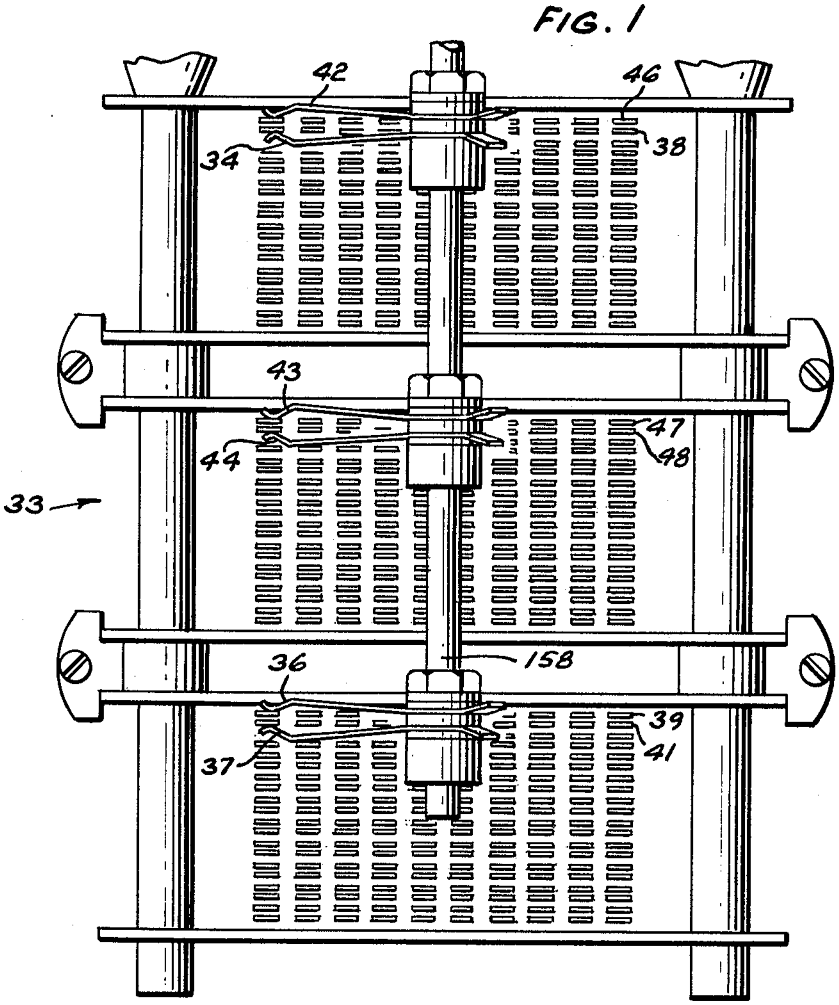
FIG. 1 is a front view of a 600 point multiple two-movement switch bank used with a final selector switch.
Figure 2:
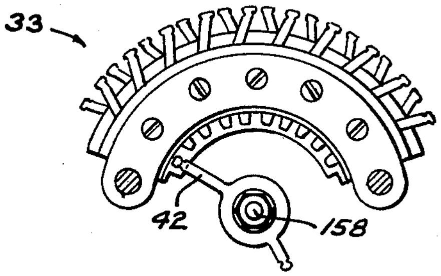
FIG. 2 is a top view of the multiple bank disclosed in FIG. 1.
Figure 6:
FIG. 6 discloses the proper arrangement of FIGS. 3, 4 and 5 in disclosing the telephone system.

The terminals of the multiple bank 21 are connected to a final selector 32 (FIG. 4) with the odd and even ring and tip terminals being interconnected by conductors 33 and 34 respectively to provide common ring and tip leads, or a talking path, within the final selector 32. The final selector 32 is then responsive to the last two digits of the called number to selectively complete the call through to either called subscriber 11 or 12 depending upon whether the called number is in an even or odd hundred group. The call is directed through the final selector 32 which is connected to the individual subscriber lines through a 600 point multiple two-movement switching bank 40 (FIG. 1). The multiple bank 40 is provided with even sleeve, ring and tip wipers 35, 36 and 37 respectively, corresponding to even sleeve, ring and tip terminals 38, 39 and 41 respectively, which connect directly to an even numbered called subscriber, as the subscriber 11. The multiple bank 40 is also provided with odd sleeve, ring and tip wipers 42, 43 and 44 respectively which correspond to odd sleeve, ring and tip terminals 46, 47 and 48 respectively which connect directly to the odd hundred called subscriber 12.

A similar path is used when the call originates from a toll switchboard 51 rather than from the calling subscriber's set 10. A toll transmission selector 52 and a toll intermediate selector 53 are responsive to all but the last two digits of the called number, which are delivered to the final selector 32 over a toll selector multiple switch bank 54. The multiple bank 54 is provided with a toll control wiper 56, a sleeve wiper 57, a ring wiper 58 and a tip wiper 59 which engage even toll control, sleeve, ring and tip terminals 61, 62, 63 and 64 respectively or odd toll control, sleeve, ring or tip terminals 66, 67, 68 and 69 respectively depending upon whether the called number steps the wipers 56 through 59 to an even or an odd level on the multiple bank 54. The call from the toll switchboard 51 proceeds through the final selector 32 and the multiple bank 40 to either the called subscriber 11 or 12 as previously described.

A wiper switching relay 113 is connected between the final selector 32 and the multiple bank 40 in such a manner that the contacts thereof connect either the even wipers 35, 36 and 37 or the odd wipers 42, 43 and 44 to the final selector switch 32. The wiper set which is connected to the final selector by the contacts of relay 113 depends upon whether the relay is in an operated or non-operated condition. The windings of the relay 113 are controlled by the preceding selector 18 or the toll transmission selector 52 over sleeve leads of the final selector 32 to operate or leave the relay in a non-operated condition depending upon whether a call from either preceding selector originates from an even or odd hundred level on the multiple bank 21 or 54. Therefore, upon siezure of the final selector 32 by either of the preceding selectors, the relay 113 is controlled to condition the multiple bank 40 to direct the call to an even subscriber's set 11 or an odd subscriber's set 12 depending upon the operation of the preceding selectors.

*Calls originating from even hundred groups of the preceding selector*

Assuming first that a call originates from the calling subscriber 10 and the last three digits are in an even hundred group, relays 71, 72 and 73 of the preceding selector 18 are placed in an operated condition in response the first digits of called number and the sleeve, ring and tip wipers 20, 22 and 23 are stepped to an even level of the multiple bank 21. The preceding selector 18 thereupon seizes the final selector 32 to operate relay generally designated 74 (FIG. 4) through an energizing circuit traced from ground through battery 76, lower winding 77 of relay 74, conductors 78, 79 and 81, normally closed contacts 82 and 83 of relay 84, conductor 86, ring lead 87, even ring terminal 24 and wiper 22 of multiple bank 21, conductor 88 of the preceding selector, contacts 89 and 91 of operated relay 71, ring lead 92 through the selector switch 17, line finder 16, subscriber's set 10 and back through tip lead 93 of line finder 16, selector switch 17, contacts 94 and 96 of operated relay 71, conductor 97, tip wiper 23, terminal 26, tip lead 98, conductor 99, contacts 101 and 102 of relay 84, conductors 103 and 104 and through upper winding 106 of relay 74 to ground. Upon the operation of relay 74, a slow to release relay 107 (FIG. 4) is operated by a circuit traced from battery 108, winding 109 of relay 107, contacts 111 and 112 of operated relay 74 to ground.

Upon the operation of relay 107, the odd level sleeve terminal 28 of multiple bank 21, which was connected to a relay 113 (FIG. 5) through the sleeve lead 114, contacts 116 and 117 of relay 107, conductor 118 to the winding 119 of relay 113, is disconnected from the relay 113 and connected to ground through contacts 116 and 121 of relay 107, conductor 122 and contacts 123 and 124 of relay 107 to ground. This ground applied to the odd level sleeve terminal 28 provides a busy test signal for the sleeve terminal to prevent other equipment from seizing the final selector 32. The closure of contacts 126 and 127 of relay 107 short circuits a winding 128 of relay 113 through conductors 129 and 131 to prevent the relay from being operated by this winding. The busy test signal is also placed upon the even sleeve terminal 62 and odd sleeve terminal 67 of the multiple bank 54 to prevent the toll transmission selector 52 from seizing the final selector 32. These busy test circuits are traced from ground applied to contacts 124 and 123 of relay 107, conductor 132, normally closed contacts 133 and 134 of relay 136, conductors 137 and 138, even sleeve lead 139 to the even sleeve terminal 62, and from the ground placed on contacts 124 and 123 of relay 107, conductor 132, normally closed contacts 133 and 134 of relay 136, conductors 137, 138 and 141, now closed contacts 127 and 126 of relay 107, odd level sleeve lead 142 to the odd level sleeve terminal 67.

Upon the calling subscriber releasing the dial 15 to provide pulses for the next to the last digit of the called number, the energizing circuit for relay 74 is broken upon each pulse while slow release relay 107 remains operated because of the short duration of the pulses. When the relay 74 first breaks or restores, a vertical stepping magnet 143 and a slow release relay generally designated 144 (both shown in FIG. 5) are energized through a circuit from battery 146, vertical stepping magnet 143, winding 147 of relay 144, conductor 148, contacts 149 and 151 of a vertical off-normal spring 152, conductor 153, now closed contacts 154 and 156 of operated slow to release relay 107, contacts 157 and 112 of the now restored relay 74 to ground.

The vertical stepping magnet 143 vertically moves a shaft 158 (FIG. 1) carrying the wipers of the multiple bank 33. Upon the first vertical movement by the shaft 158, a cam 159 (FIG. 5) cooperating with the vertical off-normal spring 152, is rotated (by means not shown) to break contacts 149 and 151 and to close contacts 151 and 161. The relay 144 remains energized upon the vertical off-normal spring 152 being moved, in that, contacts 151 and 161 are made before contacts 149 and 151 are broken, thereby providing an alternate energizing circuit for the relay 144 over the contacts 162 and 163 thereof through conductor 164, contacts 161 and 151 of the vertical off-normal spring 152 to ground through conductor 153.

When relay 74 operates after the first pulse, the vertical stepping magnet 143 is restored but relay 144 remains operated because of the slow release characteristics thereof. Successive pulses and operations of relay 74 operates the vertical stepping magnet 143 to vertically move the shaft 158 of the multiple bank 40 while the relay 144 remains operated. After the last operation of relay 74, relay 144 is restored and contacts 163 and 166 thereof are made to prepare the rotary stepping magnet 167 for operation.

When the dial 15 of the calling subscriber's set 10 is released for the last digit, relay 74 is again restored and reoperated according to the pulses in the last digit. Each time relay 74 is restored, contacts 112 and 157 thereof apply ground to a circuit which energizes the rotary stepping magnet 167 and slow release relay 179. This circuit is traced from ground through contacts 112 and 157 of relay 74, contacts 156 and 154 of relay 107, conductor 153, contacts 151 and 161 of the vertical off-normal spring 152, conductor 164, contacts 163 and 166 of relay 144, conductors 169 and 171 to contacts 172 and 173 of a relay 174. From contact 173 ground is directed through two circuits. The first circuit is from contact 173 over conductors 176 and 177, winding 178 of slow release relay 179 to battery 181 and the second circuit is from contact 173 over contacts 182 and 183 of relay 184, conductor 186, rotary stepping magnet 167 to battery 187.

On successive operations of relay 74 due to the pulsing of the last digit, the ground provided for the enregizing circuit of rotary stepping magnet 167 and relay 179 is successively applied to pulse the rotary stepping magnet 167 to thereby move the wipers carried by the shaft 158 of the multiple bank 40 into contact with the terminals of the called subscriber 11 in the even hundred group. During the pulsing of the magnet 167, relay 179 remains operated due to the slow release characteristics thereof. After the last operation of relay 74, relay 179 restores. At this point the odd hundred level sleeve, ring and tip wipers 42, 43 and 44 are disconnected from the final selector 32 and the even sleeve, ring and tip wipers 35, 36 and 37 are connected to the selector 32 and are in engagement with the sleeve, ring and tip terminals 38, 39 and 41 of the called subscriber 11.

If the dialed subscriber's line 11 is busy, ground will be placed on a sleeve lead 188 of the called subscriber's set 11 by a line finder 189 connected thereto or by another final selector then connected to this line through banks in multiple with bank 40 which will operate relay 174 through contacts of relay 179 before this relay restores. This circuit is traced from line finder 189, sleeve lead 188, sleeve terminal 38 or grounded bank in multiple with sleeve terminal 38, and wiper 35 of multiple bank 40, contacts 191 and 192 of relay 113, conductor 193, contacts 194 and 196 of relay 179, conductor 197, contacts 198 and 199 of relay 184, winding 201 of relay 174 to battery 202. Then, upon the operation of relay 174 and the restoration of relay 179, relay 174 will remain operated by a locking circuit which is established from battery 202, winding 201 of relay 174, contacts 199 and 198 of relay 184, conductor 197, contacts 196 and 203 of relay 179, contacts 204 and 206 of relay 174, conductors 207 and 132 through contacts 123 and 124 of relay 107 to ground.

The operation of relay 174 closes contacts 208 and 209 to connect a busy tone source 211 to the ring lead 88 of the preceding selector 18 and hence to the calling subscriber's set 10. This circuit is traced from battery 212, coil 213 of the busy tone source 211, contacts 214 and 216 of relay 217, conductor 218, contacts 208 and 209 of relay 174, conductors 219 and 221, contacts 222 and 223 of relay 217, conductor 224, ring lead 87 of the final selector 32, ring terminal and wiper 24 and 22 of multiple bank 21, ring lead 88 of the preceding selector 18 through the calling subscriber's set 10 and back to the tip lead 97, tip wiper 23, terminal 26, tip lead 98 of the final selector 32, conductor 99, contacts 101 and 102 of relay 84, conductors 103 and 104, and winding 106 of relay 74 to ground.

If the called line is idle, the wipers of the multiple bank 40 engage the terminals of the called subscriber's line 11 and battery is placed upon winding 226 of relay 184 (FIG. 5) from the called subscriber's line finder switch 189 after relay 179 restores. This circuit is from the line finder 189, terminal 38 and wiper 35 of multiple bank 40, contacts 191 and 192 of relay 113, conductor 193, contacts 194 and 227 of relay 179, conductor 228, winding 226 of relay 184, contacts 229 and 206 of relay 174, conductors 207 and 132 through contacts 123 and 124 of relay 107 to ground. Energization of winding 226 of relay 184 closes contacts 231 and 232 to provide a locking circuit for relay 184 to further operate the relay through the winding 233 thereof. This locking circuit is from battery 187, rotary stepping magnet 167, conductor 186, winding 233 of relay 184, contacts 231 and 232 of relay 184, conductor 234, contacts 236 and 237 of the vertical off-normal spring 152, conductors 238, 131, 141, 138 and 137, contacts 134 and 133 of relay 136, conductor 132 and through contacts 123 and 124 of relay 107 to ground. Winding 233 of relay 184 is designed to present a high resistance in the circuit of the rotary stepping magnet 167, the current through this circuit is not sufficient to operate the rotary stepping magnet but it is sufficient to fully operate the relay 184.

Upon operation of both windings 226 and 233 of relay 184, contacts 239 and 241 and contacts 183 and 182 open while contacts 242 and 243, contacts 244 and 246 and contacts 247 and 248 close as well as contacts 249 and 251. The opening of contacts 239 and 241 breaks a circuit through a release magnet 252, which functions to position the shaft 158 in the normal or starting position thereby preventing the magnet from moving the shaft to remove the wipers of the multiple bank 40 from the terminals of the called subscriber. The opening of contacts 183 and 182 prevents a low resistance path from being applied to the rotary stepping magnet 167 and thereby prevents stepping the shaft 158 to remove the wipers from the terminals of the called subscriber. The closure of contacts 243 and 242 places a ground on the sleeve lead 188 through conductor 253, contacts 192 and 191 of relay 113, sleeve wiper 35 and terminal 38 of multiple bank 40 to indicate to other selectors that the called subscriber's line is now busy.

The closure of contacts 247 and 248, contacts 244 and 246, and contacts 251 and 249 completes a circuit between a ringing source 253 and the called subscriber's set 11. This circuit may be traced from battery 254, coil 256 of the ringing source 253, spring 257 while alternately makes and breaks due to a cam 258 which is continually rotated by means not shown, conductor 259, contacts 246 and 244 of relay 184, conductors 261 and 262, winding 263 of relay 264, conductors 266 and 267, contacts 268 and 269 of relay 264, contacts 247 and 248 of relay 184, conductor 271, contacts 272 and 273 of relay 113, ring wiper and terminal 36 and 39 of multiple bank 40, ring lead 274 of subscriber's set 11, capacitor 276 and ringer 277 of the subscriber's set 11 to the tip lead 278, tip terminal and wiper 41 and 37, contacts 279 and 281 of relay 113, conductor 282, contacts 249 and 251 of relay 184, and contacts 283 and 284 of relay 264 to ground. It will be noted that the ringing current consists of both A.C. and D.C. currents, however, because of the capacitor 276 in the called subscriber's set 11, only the A.C. current passes through the winding 263 of relay 264 which is not sufficient to actuate the relay.

Upon the called subscriber answering, a receiver 286 is removed from a switch hook 287 to complete a circuit within the subscriber's set 11 whereby the capacitor 276 is bypassed to permit both the A.C. and the D.C. ringing currents to pass through the winding 263 of relay 264 which operates relay 264 to close contacts 288 and 289 thereof. Closure of these contacts completes a locking circuit for relay 264 from a battery 291 through winding 292 of relay 264, contacts 288 and 289 of relay 264, contacts 293 and 294 of relay 217, conductors 362 and 137, contacts 134 and 133 of relay 136, conductor 132, and contacts 123 and 124 of relay 107 to ground.

Upon the energizing of winding 292 of relay 264, the relay fully operates to open contacts 268 and 269 and contacts 283 and 284, and to close contacts 269 and 296 and contacts 283 and 297 to disconnect the ring and tip leads 274 and 278 of the called subscriber 11 from the ringing source 253 and to connect the leads to the ring and tip leads 87 and 98 of the final selector 32, and hence, to the ring and tip leads of the calling subscriber 10. This circuit is traced from the ring lead 274 of the called subscriber's set 11, ring terminal and contacts 39 and 36 of multiple bank 40, contacts 273 and 272 of relay 113, conductor 271, contacts 248 and 247 of relay 184, contacts 269 and 296 of relay 264, conductor 221, contacts 222 and 223 of relay 217, conductor 224, ring lead 87 through the calling subscriber's set 10 through a path previously traced, to the tip lead 98, conductor 298, contacts 299 and 301 of relay 217, contacts 297 and 283 of relay 264, contacts 251 and 249 of relay 184, conductor 282, contacts 281 and 279 of relay 113, tip wiper and terminal 37 and 41 of multiple bank 40 to the tip lead 278 of the called subscriber's set 11. The tip and ring leads of the system are now connected together to complete a talking path between the calling and called subscribers.

*Calls originating from the odd hundred group of the preceding selector*

When calls originate from the odd hundreds level of the preceding selector 18, the wipers of multiple bank 21 will be stepped to the odd hundred level terminals in response to the digits of the called subscriber's number with the exception of the last two digits therein. The sleeve wiper 20 will engage the odd sleeve terminal 28 and the ring and tip wipers 22 and 23 will engage respectively the odd ring and tip terminals 29 and 31. Upon the operation of relay 71 in the preceding selector 18 upon seizure of the final selector 32, the ring and tip leads 92 and 93 connected to the calling subscriber's set 10 will be connected to the ring and tip leads 87 and 98 of the final selector 32 through contacts 91 and 89, and contacts 94 and 96 of relay 71 and through the multiple bank 21. A temporary forwardly extending ground is applied from the preceding selector 18 to the final selector 32 to operate relay 113. This circuit extends from ground through contacts 302 and 303 of relay 73, contacts 304 and 306 of the now operated relay 71, conductor 307, wiper 20 and odd level terminal 28, conductor 114, contacts 116 and 117 of relay 107, conductor 118, winding 119 of relay 113 to battery 320. The energizing circuit for relay 73 is broken through the contacts 308 and 309 upon the operation of relay 71, however, due to the slow release characteristics of relay 73 this ground is maintained on the energizing circuit of relay 113 (FIG. 5) for a sufficient length of time to permit the relay to operate.

Simultaneously with the operation of relay 113, relay 74 is operated by being connected across the ring and tip leads 87 and 98. This energizing circuit for relay 74 is from battery 76, winding 77 of relay 74, conductors 78, 79 and 81, contacts 82 and 83 of relay 84, conductor 86, ring lead 87 through the calling subscriber's set 10 to tip lead 98, conductor 99, contacts 101 and 102 of relay 84, and conductors 103 and 104 to ground through winding 106 of relay 74. The operation of relay 74 simultaneously with the operation of relay 113 provides a locking circuit for relay 113 from battery 320, winding 119 of relay 113, contacts 312 and 311 of relay 113, conductor 313 to ground through the contacts 310 and 315 of relay 74. With this locking circuit completed, the restoring of relay 73 of the preceding selector 18 does not cause relay 113 to restore. Upon the operation of relay 74, the energizing circuit for relay 107 is completed from battery 108 through winding 109 of relay 107, contacts 111 and 112 of relay 74 to ground. The closure of contacts 314 and 316 of relay 107 completes a protective ground for the relay 113 to insure that this relay does not restore upon the pulsing of relay 74 in response to the dialed digits. The operation of relay 107 applies ground for a busy test signal to the even level sleeve terminal 19 of the multiple bank 21 through contacts 124 and 123 of relay 107 and conductors 317; to the odd level sleeve terminal 67 of multiple bank 54 through contacts 124 and 123 of relay 107, conductor 132, contacts 133 and 134 of relay 136, conductors 137, 138 and 141, contacts 127 and 126 of relay 107 and through conductor 142; and to the even level sleeve terminal 62 of the multiple bank 54 through the grounded conductor 138 to conductor 139.

With the relay 113 operated, the sleeve, ring and tip wipers 35, 36 and 37 of the even hundred level are disconnected from the final selector 32 by the opening of contacts 191 and 192, contacts 273 and 272, and contacts 279 and 281. The sleeve, ring and tip wipers 42, 43 and 44 of the odd hundred group are connected to the final selector 32 by closure of contacts 318 and 192, contacts 319 and 272, and contacts 321 and 281 of relay 113 whereby the wipers 42, 43 and 44 connect the terminals 46, 47 and 48 of the subscriber 12 to the selector 32. The call to the subscriber 12 in the odd hundred group proceeds as previously stated in respect to the even hundred call.

*Calls originating from the even hundred group of the toll selector*

With calls originating from the even hundred level of the toll selectors, toll control wiper 56 and sleeve wiper 57 are moved to an even level of multiple bank 54 to engage even toll control terminal 61 and even sleeve terminal 62 respectively, and the ring and tip wipers 58 and 59 engage the even level ring and tip terminals 63 and 64. At this point relay 322 is temporarily operated by circuitry not shown and relays 323 and 324 of the toll transmission selector 52 are also operated whereby the final selector 32 is seized by connecting the toll selector ring and tip leads 326 and 327 across relay 74 for the operation of relays 74 and 136. This circuit is from the toll switchboard 51, ring lead 326, conductor 328, contacts 329 and 331 of relay 323, conductor 332 through the toll intermediate selector 53, tip wiper and terminal 58 and 63, ring lead 333 of the final selector 32, contacts 334 and 336 of relay 217, conductors 337 and 338, winding 339 of relay 136, conductors 341 and 78, winding 77 of relay 74 to battery 76, and from toll switchboard 51, tip lead 327, contacts 342 and 343 of relay 323, conductor 344, toll intermediate selector 53, tip wiper and terminal 59 and 64 of multiple bank 54, tip lead 346 of the final selector 32, contacts 347 and 348 of relay 217, conductors 349 and 104 and winding 106 of relay 74 to ground. After the operation of relay 136, a locking circuit is closed therefor from battery 351, winding 352 of relay 136, contacts 353 and 134 of relay 136, conductors 137, 138 and 139, sleeve terminal and wiper 62 and 57, toll intermediate selector 53, conductor 354, contacts 356 and 357 of relay 323 and contacts 358 and 359 of relay 324 to ground. The ground on the sleeve lead 139 is also placed upon the toll control lead 361 of the final selector 32 through conductors 138 and 362, contacts 294 and 293 of relay 217 and conductor 363 to maintain relay 322 operated after the temporary energizing circuit therefor (not shown) is removed.

Upon the operation of relay 74, relay 107 is again operated to short circuit winding 128 of relay 113 by the closure of contacts 126 and 127 as was done in the call originating from the even level of the preceding selector 18. Relay 107 also places ground upon the odd level terminal 28 of preceding selector 18 through contacts 124 and 123 of relay 107, conductor 122, contacts 121 and 116 of relay 107, and sleeve lead 114. Ground is also placed on the even level sleeve terminal 19 through contacts 124 and 123 to sleeve lead 317 and on the odd level sleeve terminal 67 of the toll selector by connecting this terminal from the sleeve lead 142 through contacts 126 and 127 to the grounded sleeve lead 139.

After the operation of relay 74, 107 and 136, the stepping circuit of the connector 32 is prepared for operation. The stepping of the final selector 32 proceeds the same as in the case of a call originating from the even hundred level of the preceding selector in that relay 144 and vertical stepping magnet 143 move shaft 158 vertically and the relay 179 and the rotary stepping magnet 167 step the wipers horizontally to connect the sleeve, ring and tip wipers 35, 36 and 37 of the multiple bank 40 to the even hundred sleeve, ring and tip terminals 38, 39 and 41. With the call originating from the toll selectors, an additional circuit is completed upon the first vertical step of a shaft 158 to energize the relay 264. This circuit is from battery 291, winding 292 of relay 264, conductor 364, contacts 366 and 367 of the operated relay 144, conductor 368, contacts 353 and 134 of relay 136, and conductors 137 and 138 to the grounded sleeve lead 139. Upon the operation of relay 264, a locking circuit is completed therefor from battery 291, winding 292 of relay 264, contacts 288 and 289 of relay 264, conductor 363, contacts 293 and 294 of relay 217, conductors 362 and 138 to grounded sleeve lead 139.

If the dialed line is busy, ground will be placed on the sleeve lead 188 by the line finder 189 of the called subscriber 11 or by another final selector then connected to this line through banks in multiple with bank 40 to operate relay 174 from the line finder 189, sleeve terminal and wiper 38 and 35 or grounded bank terminal in multiple with sleeve terminal 38, contacts 191 and 192 of relay 113, conductor 193, contacts 194 and 196 of relay 179 before this relay is restored after the last pulse of the last digit, conductor 197, contacts 198 and 199 of relay 184, winding 201 of relay 174 to battery 202. Upon the operation of relay 174 and after the relay 179 restores, a locking circuit is again provided for relay 174 from battery 202, winding 201 of relay 174, contacts 199 and 198 of relay 184, conductor 197, contacts 196 and 203 of relay 179, contacts 204 and 206 of relay 174, conductors 207 and 132 through contacts 123 and 124 of relay 107 to ground. With relay 174 operated and relay 179 restored, a circuit is completed to energize relay 217 from battery 187, rotary stepping magnet 167, conductor 186, contacts 183 and 182 of relay 184, conductor 176, contacts 373 and 374 of relay 179, contacts 372 and 371 of relay 174, conductor 376, winding 377 of relay 217, conductor 378, contacts 353 and 134 of relay 136, conductors 137 and 138 to grounded sleeve lead 139. The high resistance of the winding 377 of relay 217 in the circuit of the rotary stepping magnet 167 prevents sufficient current from passing through the magnet to cause the magnet to operate.

Operation of relay 217 opens the contacts 294 and 293 to break a circuit connecting ground from the sleeve lead 139 to the toll control lead 361 to restore relay 322 and which also removes ground from the energizing circuit of relay 264 to cause the relay to restore. Operation of relay 217 also closes contacts 216 and 379 to connect a busy test ground to the toll ring lead 333 through spring 381 alternately connected to contact 382 by a cam 383 continually rotated by means not shown and through resistor 384, conductor 386, contacts 379 and 216 of relay 217, conductor 218, contacts 208 and 209 of relay 174, conductors 219 and 221 and contacts 222 and 334 of relay 217 to ring lead 333.

If the line dialed is idle, relay 184 (FIG. 5) will be operated after relay 179 restores from the battery applied by the line finder 189 of the called subscriber's set 11 through the winding 226 of relay 184 as previously described in connection with a call from the even level of the preceding selector 18. The relay 184 is energized to complete a locking circuit from battery 187, rotary stepping magnet 167, conductor 186, winding 233 and contacts 231 and 232 of relay 184, conductor 234, contacts 236 and 237 of the vertical off-normal spring 152, conductors 238, 131 and 141 to the grounded sleeve lead 139. Closure of contacts 183 and 387 upon operation of relay 184 completes a circuit for the operation of relay 217 from battery 187, rotary stepping magnet 167, conductor 186, contacts 183 and 387 of relay 184, conductor 376, winding 377 of relay 217, conductor 378, contacts 353 and 134 of relay 136, conductors 137 and 138 to the grounded sleeve lead 139.

Upon the operation of relay 217, contacts 293 and 294 are broken to remove ground from the energizing circuit of relay 264 and the toll control lead 361 to restore relay 322 as previously described. Relay 217 operates to disconnect the ring and tip leads 87 and 98 connected to the multiple bank 21 from the contacts of relay 264 and to connect the ring and tip leads 333 and 346, connected to the multiple bank 54, to the contacts of relay 264. This connection is made by the opening of contacts 222 and 223 and contacts 299 and 301 and the closing of contacts 222 and 334 and contacts 301 and 347. The operation of relay 217 also removes the talking path of the toll switchboard from across relay 74 and applies the talking path to the contacts of relay 264. Relay 74 is still provided with an energizing circuit, however, from battery 76, winding 77 of relay 74, conductors 78 and 341, winding 339 of relay 136, conductor 338, resistor 388, contacts 389 and 294 of relay 217, and conductors 362 and 138 to grounded sleeve lead 139. The tip and ring conductors 333 and 346 are not, however, connected through to the called subscriber in that contacts 294 and 293 have opened to restore relay 264.

When relay 264 restores after the operation of relay 217, the ringing source 253 is applied to the called subscriber's set 11 through the winding 263 of relay 264 as previously described. When the called subscriber answers the call by removing the receiver 286 from the switch hook 287, sufficient energy is allowed to pass through winding 263 of relay 264 to cause the relay 264 to operate. Upon the operation of relay 264, a locking circuit is completed therethrough from battery 291, winding 292 and contacts 288 and 289 of relay 264, toll control lead 361, toll control terminal and wiper 61 and 56, toll intermediate selector 53, conductor 391, contacts 392 and 393 of relay 323, conductor 394, contacts 396 and 397 of relay 322 through additional circuitry indicated by 398 to ground. Relay 264 also connects the talking path from the toll selectors as follows: from ring lead 333 of the final selector 32, contacts 334 and 222 of relay 217, conductor 221, contacts 296 and 269 of relay 264, contacts 247 and 248 of relay 184, conductor 271, and contacts 272 and 273 of relay 113 to the even level ring wiper 36 of multiple bank 40 to the tip wiper 37 through the called subscriber's set 11, contacts 279 and 281 of relay 113, conductor 282, contacts 249 and 251 of relay 184, contacts 283 and 297 of relay 264, contacts 301 and 347 of relay 217, tip lead 346 of the final selector 32 and back to the ring lead 333 through the toll switchboard by circuit previously traced. The tip and ring leads of the system are now connected together to complete a talking path between the calling and called subscribers.

*Calls originating from odd hundred level of the toll selector*

When calls originate from the odd hundreds level of the toll selector, the ring and tip leads 326 and 327 of the toll switchboard 51 are placed across relays 74 and 136 to operate these relays as described in the discussion of the call originating from the even hundred level of the toll selector to seize the final selector 32. Upon seizure of the final selector 32, a path is completed from battery 399, winding 401 of relay 322 which is temporarily operated by an energizing circuit (not shown) under control of the toll switchboard through contacts 402 and 396, conductor 394, contacts 393 and 392 of relay 323, conductor 391, toll intermediate selector 53, toll control wiper 56 and engaged terminal 66, conductor 403, toll control lead 361, conductor 363, contacts 293 and 294 of relay 217, conductors 362, 138, 141 and 131, winding 128 of relay 113 and conductor 129, sleeve lead 142, odd level terminal and sleeve wiper 67 and 57, toll intermediate selector 53, conductor 354, contacts 356 and 357 of relay 323 and contacts 358 and 359 of relay 324 to ground. This energizing circuit operates relay 113 which locks to ground from battery 320, winding 119 of relay 113, contacts 312 and 311, conductor 313 through contacts 310 and 315 of relay 74 to ground.

Upon the operation of relay 107 through contacts 111 and 112 of relay 74, a protective ground is applied to relay 113 by contacts 314 and 316 to prevent relay 113 from restoring upon the pulsing of relay 74. The operation of relay 107 closes contacts 126 and 127 to connect ground to the even level sleeve lead 139 through conductor 141 to the grounded odd level sleeve lead 142 for applying a busy test ground signal for the even level of the toll selector. Busy ground is also placed on the even level sleeve lead 317 of the preceding selector 18 through the contacts 123 and 124 of relay 107 and to the odd level sleeve lead 114 through the contacts 124 and 123 of relay 107, conductor 122, and contacts 121 and 116 of relay 107. Relay 113 is now operated to disconnect the even sleeve, ring and tip wipers 35, 36 and 37 of the multiple bank 40 from the final selector 32 and to connect the odd sleeve, ring and tip wipers 42, 43 and 44 to the final selector 32 and to the odd sleeve, ring and tip terminals 46, 47 and 48. The call then proceeds as described in connection with calls originating from the even hundred level of the toll selector except that the call is directed to the called subscriber 12 in the odd hundreds group.

It will be noted that the final selector described above is capable of being connected to a preceding local selector and/or a toll transmission selector to connect 200 subscriber lines thereto even though the preceding selectors are of a standard type which are designed for final selectors handling only 100 subscriber lines without the necessity of modifying the preceding selectors. The above-described final selector 32 is also designed to select called subscribers in either the even or odd hundred group simultaneously with the seizure of the final selector upon the reception of a temporary forwardly extending ground from the preceding selector to the final selector.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a telephone system, a final selector switch including a multiple switch bank and having a plurality of wiper sets connectible to different groups of subscriber lines, said final selector switch having a pulsing circuit for positioning the wiper sets, a preceding selector switch having a pair of paths over which a call may be directed and connectible to seize the final selector and to operate said pulsing circuit, means placed in a control condition by the preceding selector simultaneously with the seizure of the final selector for rendering effective a wiper set depending upon the path over which the call was directed, and relay means within the final selector operated upon completion of the seizure for maintaining said means in the control condition and applying a busy test signal to the path not used for the call.

2. In a telephone system, a final selector switch including a multiple switch bank and having a plurality of wiper sets connectible to different groups of subscriber lines, said final selector switch having a pulsing circuit for positioning the wiper sets, a standard preceding selector switch having a pair of paths over which a call may be directed and connectible to seize the final selector and to operate said pulsing circuit, means placed in a control condition by a forwardly extending ground from the preceding selector upon seizure of the final selector for rendering effective one of said sets of wipers dependent upon the path over which the call was directed, and relay means within the final selector operated upon completion of the seizure for maintaining said means in the control condition and applying a busy test signal to the path not used for the call.

3. In a telephone system, a final selector switch including a multiple switch bank and having a set of wipers for subscriber lines indicative of an even hundreds group and a set of wipers for subscriber lines indicative of an odd hundreds group, said final selector switch having a common talking path for calls to subscribers in both groups normally connected to the even set of wipers, and a sleeve lead individual to each group; a standard preceding selector switch for seizing the final selector and having even and odd sleeve leads connected to respective even and odd sleeve leads of the final selector, a ground circuit in the preceding selector for applying a forwardly extending ground to the sleeve leads of the preceding selector, first means connected to the odd sleeve lead of the final selector and operated by the application of the forwardly extending ground on the odd sleeve lead of the preceding selector and seizure of the final selector for disconnecting the even set of wipers from the talking path and connecting the odd set of wipers to the talking path, and second means within the final selector operable upon completion of the seizure and the operation of the first means for maintaining said second means in an operable condition and applying a busy test signal to the even sleeve lead.

4. In a telephone system, a final selector switch including a multiple switch bank and having a set of wipers for subscriber lines indicative of an even hundreds group and a set of wipers for subscriber lines indicative of an odd hundreds group, said final selector switch having a common talking path for calls to subscribers in both groups normally connected to the even set of wipers, and a sleeve lead individual to each group; a preceding selector switch for seizing the final selector and having even and odd sleeve leads connected to respective even and odd sleeve leads of the final selector, first relay means connected to the odd sleeve lead of the final selector and operated by the preceding selector applying a forwardly extending ground to the odd sleeve lead upon seizure of the final selector for disconnecting the even set of wipers from the talking path and connecting the odd set of wipers to the talking path, and second relay means within the final selector operated by completion of the seizure and operation of the first relay means for maintaining said means in an operated condition and applying a busy test signal to the even sleeve lead.

5. In a telephone system, a combination local toll final selector including a multiple switch bank and having a plurality of wiper sets connectible to different groups of subscriber lines, said final selector having a pulsing circuit for positioning the wiper sets, a standard preceding local selector switch having a pair of paths and connected to seize the final selector and to operate said pulsing circuit for directing a call over one of said pair of paths, a standard preceding toll selector switch also having a pair of paths and connected to seize the final selector and to operate said pulsing circuit, first means controlled by a forwardly extending ground from the preceding selector first seizing the final selector for rendering effective one of said wiper sets dependent upon the path over which the call was directed, and second means within the final selector operated upon the completion of seizure of the final selector for maintaining said first means in the controlled condition and applying a busy test signal to all other paths not used.

6. In a telephone system, a final selector switch including a multiple switch bank and having a set of wipers for subscriber lines in an even hundreds group and a set of wipers for subscriber lines in an odd hundreds group, said final selector switch having a single talking path for calls to subscribers in both groups normally connected to the even set of wipers, said final selector also having a pair of sleeve leads individual to each group of subscriber lines, a standard preceding local selector switch connected to seize the final selector for directing calls over the talking path thereof, said local selector having an even sleeve lead and an odd sleeve lead connected to the respective even and odd sleeve leads of one pair in the final selector, a standard preceding toll selector switch connected to seize the final selector for directing calls over the talking path thereof, said toll selector having an even sleeve lead and an odd sleeve lead connected to respective even and odd sleeve leads of the other pair in the final selector, a ground circuit in each of the preceding selectors for applying a forwardly extending ground to the sleeve leads of the preceding selectors, first means connected to the odd sleeve leads of the final selector and operated by the application of the forwardly extending ground to the odd sleeve leads from the preceding selector first to seize the final selector for disconnecting the even set of wipers from the talking path and connecting the odd set of wipers to the talking path, and second means within the final selector operated upon completion of seizure thereof by one of the preceding selectors for preventing seizure of the final selector by the other preceding selector and maintaining the first means in the state of operation thereof.

7. A final selector switch in a telephone system connectible to a preceding selector switch under the control thereof for connecting subscriber lines in the system, which comprises a single talking path connectible to a plurality of sources of calls in the preceding selector switch, a sleeve lead individual to each source, a wiper set corresponding to each source for connecting the talking path to subscriber lines, means temporarily controlled simultaneously with a connection of the talking path to one of the plurality of sources by the sleeve lead individual to said one source for rendering effective the wiper set corresponding to said source, relay means operated by the completion of said connection of the talking path, first contacts effective upon operation of said relay means for retaining said means in the controlled condition, and second contacts effective upon operation of said relay means for applying a busy test signal to the other sources over the sleeve leads associated therewith.

8. A final selector switch in a telephone system connectible to a preceding selector switch under the control thereof which comprises a set of wipers for subscriber lines representing an even hundreds group, a set of wipers for subscriber lines representing an odd hundreds group, a single talking path connected to the even set of wipers and connectible to an even or odd hundreds level of the preceding selector switch, an even and odd sleeve lead, a first relay means connected to the odd sleeve lead and operable by signals conducted thereover simultaneously with a connection of the talking path to the odd hundreds level of the preceding selector switch for disconnecting the talking path from the even wiper set and connecting the talking path to the odd wiper set, and second relay means operable by connection of the talking path to the even hundreds level for preventing operation of the first relay means.

9. A final selector switch for use in a telephone system having a preceding selector selectively operated in accordance with the odd or even characteristic of a hundreds digit of a multi-digit switching signal which comprises, a set of wipers for subscriber lines indicative of an even hundreds group, a set of wipers for subscriber lines indicative of an odd hundreds group, a pulsing circuit for positioning the wiper sets, a first relay means operable to prepare the pulsing circuit for operation, a single talking path connected to the even wiper set and connectible to an even or odd hundreds level of the preceding selector for operating said first relay means, an even and odd sleeve lead, a second relay means connected to the odd sleeve and operable by signals conducted thereover simultaneously with a connection of the talking path to the odd hundreds level of the preceding selector for disconnecting the talking path from the even wiper set and connecting the talking path to the odd wiper set, first contacts on said first relay means effective upon said connection of the talking path to the odd level of the preceding selector for maintaining said second relay means operated and applying a busy test signal to the even sleeve lead, and second contacts on said first relay means effective upon a connection of the talking path to the even hundreds level of the preceding selector for preventing said second relay means from operating and applying a busy test signal to the odd sleeve lead.

10. A combination toll and local final selector switch in a telephone system connectible to either a preceding local or toll selector switch under the control thereof which comprises, a set of wipers for subscriber lines indicative of an even hundreds group, a set of wipers for subscriber lines indicative of an odd hundreds group, a single talking path connected to the even set of wipers and connectible to an even or odd hundreds level of either the toll or a local preceding selector, an even and odd sleeve lead associated with each preceding selector, a first relay means connected to the odd sleeve leads and operable by signals conducted thereover simultaneously with a connection of the talking path to the odd hundreds level of either preceding selector for disconnecting the talking path from the even wiper set and connecting the talking path to the odd wiper set, second relay means operable by connection of the talking path to the even hundreds level of either preceding selector for preventing operation of the first relay means, and contacts on said second relay means effective upon connection of the talking path to one level of the preceding selectors for applying a busy test signal to the other levels.

11. A combination toll and final selector switch for use in a telephone system connectible to either a preceding toll or local selector switch under the control thereof which comprises, a set of wipers for subscriber lines in an even hundreds group, a set of wipers for subscriber lines in an odd hundreds group, a pulsing circuit for positioning the wiper sets, a first relay means operable to prepare the pulsing circuit for operation, a single talking path connected to the even wiper set and connectible to an even or odd hundreds of either the toll or local preceding selector for operating said first relay means, an even and odd sleeve lead associated with each preceding selector, a second relay means connected to the odd sleeve leads and operable by signals conducted thereover simultaneously with a connection of the talking path to the odd hundreds level of either preceding selector for disconnecting the talking path from the even wiper set and connecting the talking path to the odd wiper set, first contacts on said first relay means effective upon the connection of the talking path to either odd level for maintaining said second relay means operated, and second contacts on said first relay means effective upon the connection of the talking path to either even level for preventing said second relay from operating.

References Cited in the file of this patent

UNITED STATES PATENTS

| | | |
|---|---|---|
| 1,725,152 | Lomax | Aug. 20, 1929 |
| 1,910,393 | Kahn | May 23, 1933 |
| 1,990,677 | Taylor et al. | Feb. 12, 1935 |
| 2,832,835 | Frank | Apr. 29, 1958 |

FOREIGN PATENTS

| | | |
|---|---|---|
| 717,681 | Great Britain | Nov. 3, 1954 |